United States Patent [19]

Lee et al.

[11] Patent Number: 5,298,820
[45] Date of Patent: Mar. 29, 1994

[54] MINIATURE MOTOR WITH INTEGRATED STATOR COIL END SUPPORTS

[75] Inventors: Takanobu Lee; Ikuo Matsushita; Masao Take; Masahiro Mifune, all of Matsudo, Japan

[73] Assignee: Mabuchi Motor Co., Ltd., Chiba, Japan

[21] Appl. No.: 979,288

[22] Filed: Nov. 20, 1992

[30] Foreign Application Priority Data

Nov. 21, 1991 [JP] Japan .................................. 95300

[51] Int. Cl.⁵ ..................... H02K 03/46; H02K 15/14; H02K 37/14
[52] U.S. Cl. .............................. 310/40 MM; 310/42; 310/194; 310/254
[58] Field of Search ............... 310/40 MM, 42, 49 R, 310/255, 258, 259, 260, 71, 194, 208, 257

[56] References Cited

U.S. PATENT DOCUMENTS

| | | | |
|---|---|---|---|
| 4,107,559 | 8/1978 | Patel | 310/49 R |
| 4,471,246 | 9/1984 | Paillet | 310/42 |
| 4,720,646 | 1/1988 | Torimoto | 310/71 |
| 4,841,190 | 6/1989 | Matsushita et al. | 310/257 |
| 5,001,379 | 3/1991 | Katayama | 310/194 |
| 5,004,941 | 4/1991 | Ohzeki et al. | 310/49 R |
| 5,043,613 | 8/1991 | Kurata et al. | 310/49 R |
| 5,057,732 | 10/1991 | Fukaya | 310/208 |
| 5,121,017 | 6/1992 | Yamamoto et al. | 310/49 R |

Primary Examiner—Steven L. Stephan
Assistant Examiner—D. R. Haszko
Attorney, Agent, or Firm—McGlew and Tuttle

[57] ABSTRACT

A miniature motor comprising a rotor having a plurality of axially extending magnetic poles disposed on the outer periphery thereof in the circumferential direction, and a stator having two axially disposed coils wound on coil bobbins, in which flanges whose outside diameter is larger than the outside diameter of hollow cylindrical coil cores are provided on both ends in the axial direction of the coil cores, the coil bobbins having on one of the flanges projections protruding toward the outside in the axial direction of the coil cores are disposed in such a manner that the projections are directed toward each other, and that the projection on one coil bobbin faces the coil core of the other coil bobbin.

4 Claims, 3 Drawing Sheets

MINIATURE MOTOR WITH INTEGRATED STATOR COIL END SUPPORTS

BACKGROUND OF THE INVENTION

This invention relates generally to a miniature motor, such as stepping motors used for printers, facsimiles, etc., and more particularly to a miniature motor in which the construction of the coil bobbins as a component element of the stator has been improved.

DESCRIPTION OF THE PRIOR ART

Stepping motors as one type of miniature motors have heretofore been widely used as a drive source for information processing and other various equipment. FIG. 1 is a longitudinal sectional view illustrating the essential part of an example of conventional-type stepping motor. FIG. 2 is a crosssectional view taken along line A—A in FIG. 1. In FIGS. 1 and 2, numeral 1 refers to a housing made of a metallic material, such as mild steel, and formed into a bottomed hollow cylindrical shape, on the inner circumferential surface of which a yoke 2 made of a ferromagnetic material and formed into an annular shape, a coil bobbin made of an insulating material and formed into an annular shape, and a coil 4 wound on the coil bobbin 3 are provided. Numeral 5 refers to an end plate fitted to the opening of the housing 1.

Numeral 6 refers to a rotor made of a permanent-magnet material, such as ferrite, and formed into a circular column shape, on the outer circumferential surface of which a plurality of axially extending magnetic poles are disposed in the circumferential direction. Numeral 7 refers to a shaft fixedly fitted to the axial center of the rotor 6, and rotatably supported by bearings 8 provided on the housing 1 and the end plate 5. Numeral 9 refers to a mounting plate.

The coil bobbin 3 is provided by integrally forming flanges 32 having an outside diameter larger than the outside diameter of a hollow cylindrical coil core 31 on both ends in the axial direction of the coil core 31. One flange 32 has a terminal part 33 on which terminals 10 and a common terminal 11 are provided. The coil 4 is wound on the coil bobbin 3 by first connecting a wire winding start 41 to one of the terminals 10 and connecting a wire winding end 42 to the common terminal 11. Furthermore, another wire winding start 41 of the coil 4 constituting another phase is connected to the common terminal 11, and the wire winding end 42 to the other terminal 10. To cause the terminal part 33 to protrude outward the housing 1, a notch 12 is provided on the housing 1. Numeral 13 refers to a printed circuit board; 14 to a connector electrically connected to the terminals 10 and the common terminal 11.

With the aforementioned construction, as power is fed to the coil 4 via the connector 14 and the printed circuit board 13, the yoke 2 is excited by a combination of two phases of current flowing in the coil 4, and the rotor 6 formed by disposing a plurality of magnetic poles on the outer periphery thereof is caused to rotate in angular steps.

In the conventional type of stepping motor having the aforementioned construction, the following problems are encountered in forming the coil 4.

To wind the coil 4 on the coil bobbin 3, the wire winding start 41 is invariably located in the vicinity of the flange 32 on the side on which the terminals 10 and the common terminal 11 are provided, while the wire winding end 42 is not necessarily located on the side of the wire winding start 41 and may sometimes be located on the side of the other flange 32. As a result, the wire winding end 42 is connected to the terminal 10 or the common terminal 11 by running over the coil 4 in a suspended state, as shown in FIG. 1. This tends to cause the wire winding end 42 to interfere with the notch 12 of the housing 1, to resulting in shortcircuiting.

A means to overcome this problem by forming the notch 12 of the housing 1 into a larger size is not desirable since it would lead to enlarging the opening, increasing the possibility of allowing foreign matter to enter the housing 1, and also a reduction in the strength and/or dimensional accuracy of the housing 1. Furthermore, there can be a means to provide a projection for hooking the wire ends of the coil 4 inside the flange 32 on the side of the coil bobbin 3 on which the terminals 10 and the common terminal 11 are provided. With this arrangement, however, if a projection having a sufficient length to hook both the wire winding start and end 41 and 42 is provided, the winding of the coil 4 on the coil bobbin 3 becomes extremely complex. This may also lead to failure of coil winding in extreme cases.

A means to bond the wire winding start and end 41 and 42 to a portion on the coil 4 immediately below the terminals 10 and the common terminal 11 using adhesive has been attempted. This means, however, would entail a problem of excess adhesive, and make bonding operation extremely troublesome because of a limited bonding area on the small-sized coil 4 in a miniature motor.

SUMMARY OF THE INVENTION

This invention is intended to overcome the problems inherent in the prior art. It is an object of this invention to provide a miniature motor having a coil bobbin that is easy to fix coil ends and can prevent shortcircuiting accidents.

DETAILED DESCRIPTION OF THE EMBODIMENTS

Figure 1:
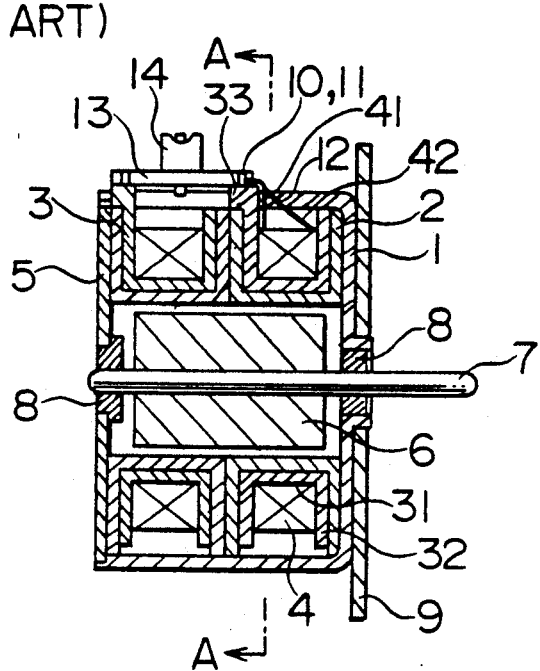
FIG. 1 is a longitudinal sectional view illustrating the essential part of an example of conventional-type stepping motor.
Figure 2:
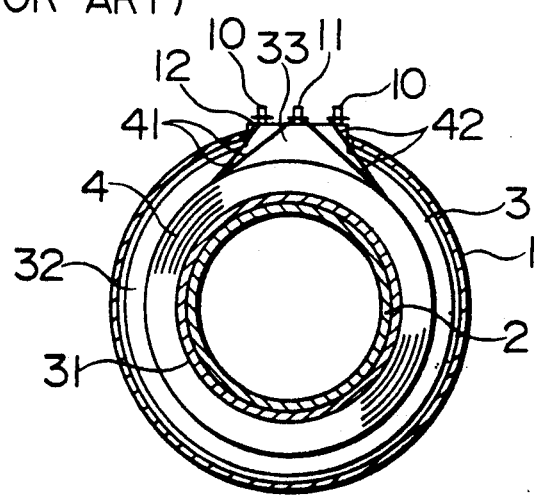
FIG. 2 is a cross-sectional view taken along line A—A in FIG. 1.
Figure 3:
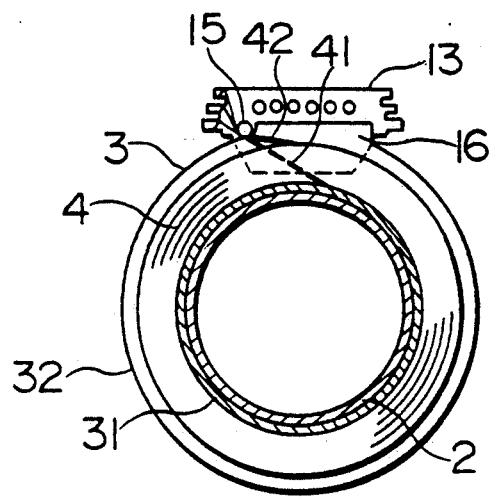
FIGS. 3 and 4 are cross-sectional and longitudinal sectional views illustrating an embodiment of this invention.
Figure 4:
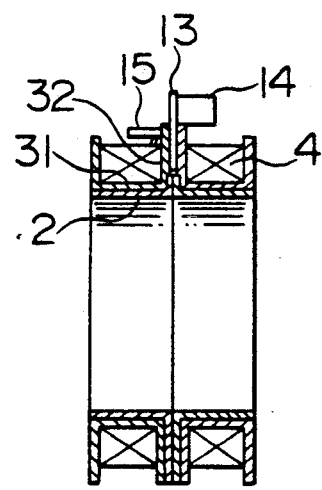
Figure 5:
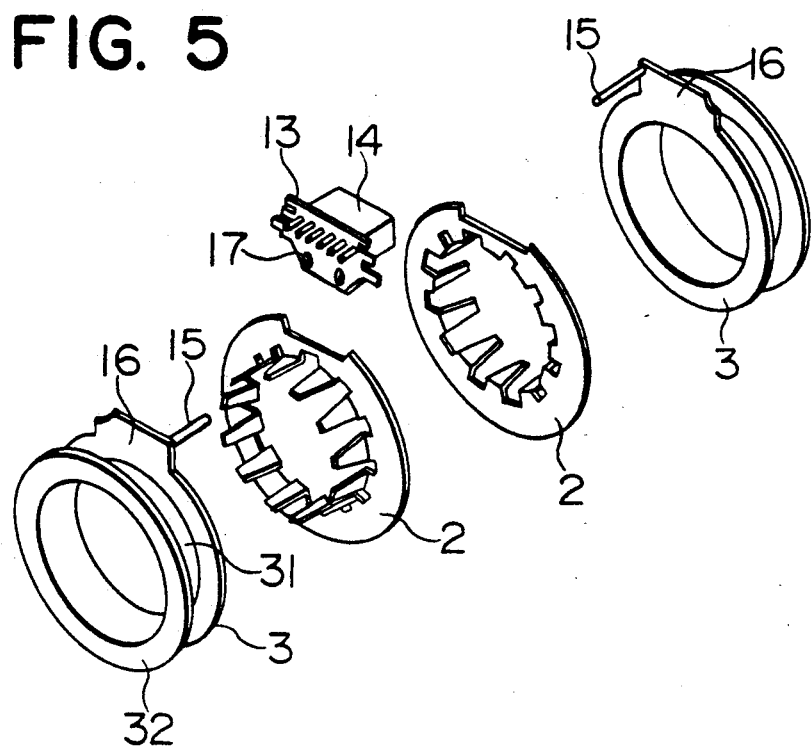
FIG. 5 is an exploded perspective view of the component members shown in FIGS. 3 and 4.

FIGS. 3 and 4 are cross-sectional and longitudinal section al views illustrating an embodiment of this invention. FIG. 5 is an exploded perspective view of the component members shown in FIGS. 3 and 4. Like parts are indicated by like reference numerals used in FIGS. 1 and 2. In FIGS. 3 and 5, numeral 15 refers to a projection provided on an extended portion 16 of the coil bobbin 3, which is provided in a direction normal to the axial line on one of the flanges 32 of the coil bobbin 3, in such a manner as to protrude outward in the axial direction of the coil core 31. The two coil bobbins 3 are disposed in such a manner that when the projections 15 are arranged so as to be directed toward each other, the projection 15 of one coil bobbin 3 faces the coil core 31 of the other coil bobbin 3.

When assembling the coil bobbins 3 having the aforementioned construction, two coil bobbins 3 on the coil cores 31 of which the coils 4 are wound are prepared. The yokes 2 are assembled in such a manner that the printed circuit board 13 on which the connector 14 is mounted is interposed between the yokes 2, and then the coil bobbins 3 are assembled in such a manner that the projections are directed toward each other, and that the yokes 2 are interposed between the coil bobbins 3, as shown in FIG. 5. In FIG. 5, the coils 4 are not shown.

When the coil bobbins 3 are assembled in the aforementioned manner, the projection 15 provided on the extended portions 16 on one of the coil bobbin 3 is passed into a through hole 17 provided on the printed circuit board 13 so that the projection 15 is disposed facing the coil core 31, that is, the coil 4, of the other coil bobbin 3. Thus, the wire winding start and end 41 and 42 can be hooked from under the projection 15.

In this case, since the projection 15 can be formed in a sufficient axial length to hook the wire winding start and end 41 and 42, wire threading is easily performed and the loosening of the wire after threading can be prevented. In addition, the wire winding end 41 can be prevented from coming in contact with the notch 12 of the housing I shown in FIGS. 1 and 2, that is, from shortcircuiting because the wire winding end 42 can be drawn in the direction vertical to the axial line at a location near the wire winding start 41 located on the other side of the flange 32.

Figure 6:
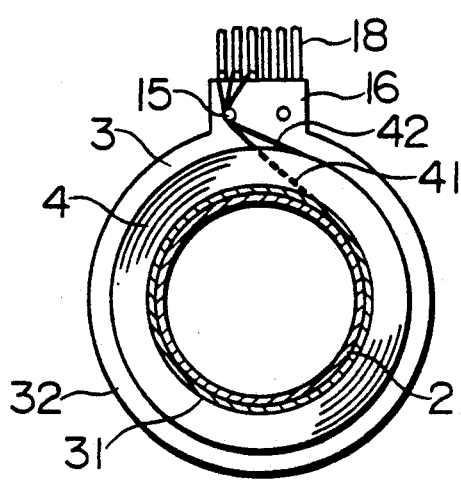
FIGS. 6 and 7 are cross-sectional and longitudinal sectional views illustrating another embodiment of this invention.
Figure 7:
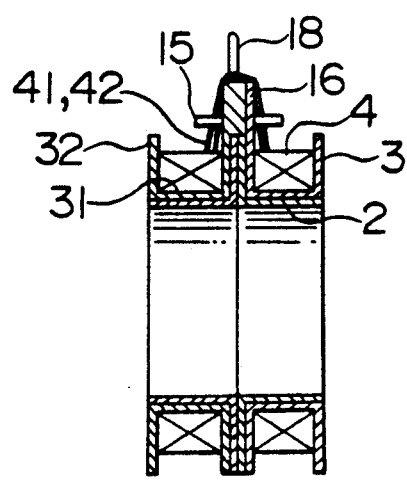

FIGS. 6 and 7 are cross-sectional and longitudinal sectional views illustrating another embodiment of this invention. Like parts are indicated by like numerals in FIGS. 3 through 5. In FIGS. 6 and 7, numeral 18 refers to a terminal provided on the extended portion 16 of the flange 32 in such a manner as to protrude in the direction vertical to the axial line.

With the aforementioned construction, as the coil bobbins 3 are assembled by interposing the two yokes 2 between the two coil bobbins 3, as in the case of the embodiment described above (the printed circuit board 13 and the connector 14 shown in FIG. 5 are not provided in this embodiment), the projection 15 provided on one coil bobbin 3 faces the coil 4 wound on the other coil bobbin 3, the wire winding start and end 41 and 42 can be easily hooked on the projection 15. Thus, shortcircuiting can also be effectively prevented as in the case of the previous embodiment described above. The wire winding start and end 41 and 42 are connected to the corresponding terminals 18. As for connection after the terminals 18, a printed circuit board and connectors may be connected to the terminals 18 as in the case of the previous embodiment, or lead wires may be connected directly to the terminals 18.

In this embodiment, description has been made about the projections provided on the coil bobbins of a round rod shape. The projection may be of any other shapes, or grooves or other engaging means may be provided to facilitate the hooking of the coil ends as necessary. The projections may be formed integrally with the coil bobbins, or the projections and the coil bobbins may be manufactured separately and combined into one piece later. Furthermore, this invention can be applied to other miniature motors than stepping motors.

This invention having the aforementioned construction and operation makes it easy to wind coils on coil bobbins, to fix coil ends, prevents the interference of the coil ends with the housing, or shortcircuiting, and improves freedom in disposing the terminals.

What is claimed is:

1. A miniature motor, comprising:
    a rotor having a plurality of axially extending poles disposed on an outer periphery of said rotor in a circumferential direction of said rotor;
    a stator having tow axially disposed coils each coil having a winding start and a winding end and two coil bobbins, a first of said axially disposed coils being wound on a first of said coil bobbins and a second of said axially disposed coils being wound on a second of said coil bobbins, each coil bobbin including
        a hollow cylindrical coil core having a cylindrical coil core diameter,
        an inner flange and an outer flange, each of said inner flange and said outer flange having a diameter which is greater than said cylindrical coil core diameter,
        an extended part formed on said inner flange and including a cutaway at a first end of said extended part, said extended part extending radially beyone said diameter of said inner flange,
        a projection formed on a second end of said extended part, said projection protruding outwardly in an axial direction of said coil core, said projection having an axial length for engaging, in a hooking manner, said winding start and said winding end of one of said coils, each of said first coil bobbin and said second coil bobbin being disposed with said projection directed toward the other of said first coil bobbin and said second coil bobbin with said projection of said first coil bobbin extending above said second coil core of said second coil bobbin, through said cutaway part of said second coil bobbin and with said projection of said second coil bobbin extending above said first coil core of said first coil bobbin, through said cutaway part of said first coil bobbin.

2. A miniature motor according to claim 1, wherein said projection is formed as a round-shaped rod.

3. A miniature motor, comprising:
    a rotor having a plurality of axially extending poles disposed on an outer periphery of said rotor in a circumferential direction of said rotor;
    a stator having two axially disposed coils each coil having a winding start and a winding end and two coil bobbins, a first of sad axially disposed coils being wound on a first of said coil bobbins and a second of said axially disposed coils being wound on a second of said coil bobbins, each coil bobbin including
        a hollow cylindrical coil core having a cylindrical coil core diameter,
        an inner flange and an outer flange, each of said inner flange and said outer flange having a diameter which is greater than said cylindrical coil core diameter,
    an extended part formed on said inner flange and including a cutaway at a first end of said extended part, said extended part extending radially beyond said diameter of said inner flange, a projection formed on a second end of said extended part, said projection protruding outwardly in an axial direction of said coil core, said projection having an axial length for engaging, in a hooking manner, said winding start and said winding end of one of said coils, each of said first coil bobbin and said second coil bobbin being disposed with said projection directed toward the other of said first coil bobbin and said second coil bobbin with said projection of said first coil bobbin extending above said second coil core of said second coil bobbin, through said cutaway part of said second coil bobbin and with said projection of said second coil bobbin extending above said first coil core of said first coil bobbin, through said cutaway part of said first coil bobbin;

a first yoke and a second yoke, each bobbin being supported by one of said yokes.

4. A miniature motor according to claim 3, further comprising a printed circuit board interposed between the yokes, a power connector being supported by said printed circuit board.

* * * * *